(12) United States Patent
Banerjee et al.

(10) Patent No.: US 9,742,673 B2
(45) Date of Patent: Aug. 22, 2017

(54) INCREASING MULTICAST SCALE VIA LOCALIZATION OF INDICES

(71) Applicant: Cisco Technology, Inc., San Jose, CA (US)

(72) Inventors: Ayan Banerjee, Fremont, CA (US); Srinivasan Ramabadran, Sunnyvale, CA (US); Mehak Mahajan, San Jose, CA (US); Raghava Sivaramu, San Jose, CA (US); Nataraj Bacthu, San Jose, CA (US); Raja Rao Tadimeti, San Jose, CA (US); Madhava Rao Cheethirala, San Jose, CA (US); Ramana Mellacheruvu, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/477,244

(22) Filed: Sep. 4, 2014

(65) Prior Publication Data

US 2015/0124684 A1    May 7, 2015

Related U.S. Application Data

(60) Provisional application No. 61/900,353, filed on Nov. 5, 2013.

(51) Int. Cl.
*H04H 20/71* (2008.01)
*H04L 12/741* (2013.01)
(Continued)

(52) U.S. Cl.
CPC ............ *H04L 45/745* (2013.01); *H04L 45/16* (2013.01); *H04L 45/72* (2013.01); *H04L 45/748* (2013.01);
(Continued)

(58) Field of Classification Search
CPC ........ H04L 47/33; H04L 51/10; H04W 28/12; H04W 72/005
(Continued)

(56) References Cited

U.S. PATENT DOCUMENTS

| 6,735,198 B1 * | 5/2004 | Edsall ..................... H04L 45/54 370/389 |
| 6,954,463 B1 | 10/2005 | Ma et al. |

(Continued)

FOREIGN PATENT DOCUMENTS

WO    WO 02/052442    7/2002

OTHER PUBLICATIONS

International Search Report and Written Opinion for PCT/US2014/063245, mailed Mar. 23, 2015.
(Continued)

*Primary Examiner* — Peter Cheng
(74) *Attorney, Agent, or Firm* — Polsinelli LLP

(57) ABSTRACT

A plurality of line cards with each line card having a respective network forwarding engine and a respective outgoing interface (OIF) list and at least one fabric module communicatively coupled with each line card with each fabric module can have a respective network forwarding engine. The local OIF list can be asymmetrically programmed. The network forwarding engine of a line card can be configured to receive a multicast packet, compare a multicast address associate with the received multicast packet with entries in the local OIF list of the line card and forward the received multicast packet to at least one interface associated with the multicast address in response to the comparison resulting in a match.

11 Claims, 7 Drawing Sheets

(51) Int. Cl.
  *H04L 12/58* (2006.01)
  *H04W 28/12* (2009.01)
  *H04W 72/00* (2009.01)
  *H04L 12/721* (2013.01)
  *H04L 12/801* (2013.01)
  *H04L 12/761* (2013.01)
  *H04L 12/745* (2013.01)

(52) U.S. Cl.
  CPC .............. *H04L 47/33* (2013.01); *H04L 51/10* (2013.01); *H04W 28/12* (2013.01); *H04W 72/005* (2013.01)

(58) Field of Classification Search
  USPC .......................................................... 370/312
  See application file for complete search history.

(56) References Cited

U.S. PATENT DOCUMENTS

| | | | |
|---|---|---|---|
| 6,996,099 | B1 | 2/2006 | Kadambi et al. |
| 7,313,666 | B1 | 12/2007 | Saminda De Silva et al. |
| 8,687,629 | B1 | 4/2014 | Kompella et al. |
| 2002/0126671 | A1* | 9/2002 | Ellis ........................ H04L 12/18 370/390 |
| 2003/0067924 | A1 | 4/2003 | Choe et al. |
| 2004/0073715 | A1 | 4/2004 | Folkes et al. |
| 2005/0105524 | A1* | 5/2005 | Stevens ................... H04L 45/04 370/389 |
| 2005/0141517 | A1 | 6/2005 | Choi et al. |
| 2008/0130601 | A1* | 6/2008 | Kim ..................... H04L 12/2856 370/338 |
| 2008/0151863 | A1 | 6/2008 | Lawrence et al. |
| 2010/0150155 | A1 | 6/2010 | Napierala |
| 2011/0038375 | A1 | 2/2011 | Liu et al. |
| 2011/0122889 | A1 | 5/2011 | Pacella et al. |
| 2011/0228795 | A1 | 9/2011 | Agrawal et al. |
| 2011/0249682 | A1 | 10/2011 | Kean et al. |
| 2011/0307656 | A1 | 12/2011 | Hamdi et al. |
| 2014/0146824 | A1 | 5/2014 | Angst et al. |
| 2014/0244779 | A1 | 8/2014 | Roitshtein et al. |
| 2015/0124633 | A1 | 5/2015 | Banerjee et al. |
| 2015/0124806 | A1 | 5/2015 | Banerjee et al. |
| 2015/0236900 | A1 | 8/2015 | Chung |

OTHER PUBLICATIONS

International Search Report and Written Opinion for PCT/US2014/063252, mailed May 5, 2015, 9 pages.
International Search Report and Written Opinions for PCT/US2014/063577, mailed Jan. 30, 2015, 10 pages.

* cited by examiner

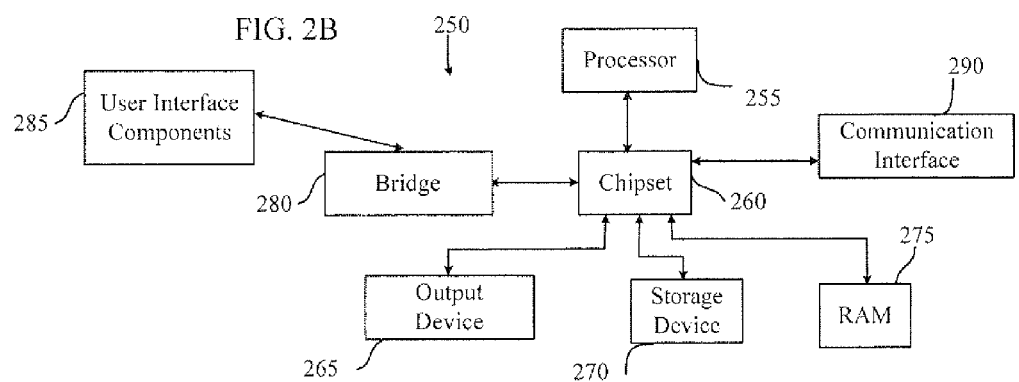
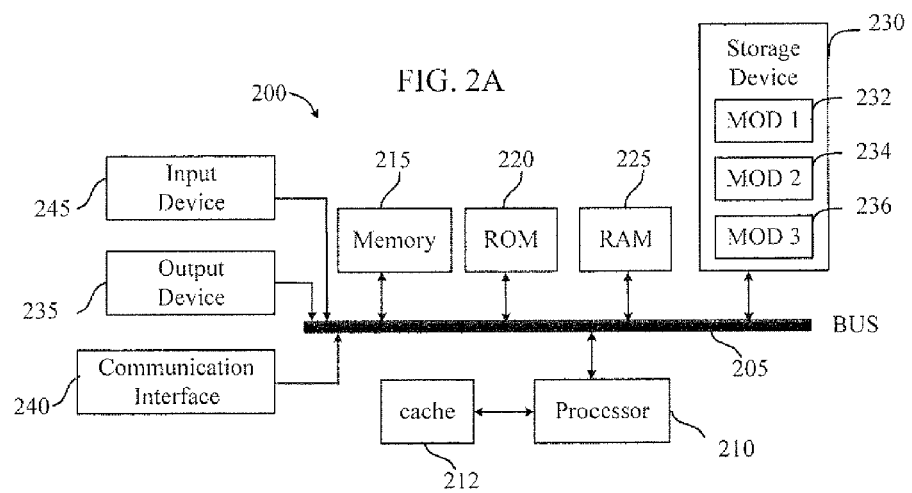

INCREASING MULTICAST SCALE VIA LOCALIZATION OF INDICES

CROSS REFERENCE TO RELATED APPLICATION

This application claims priority to U.S. Provisional Patent Application No. 61/900,353, filed Nov. 5, 2013, which is expressly incorporated herein by reference in its entirety.

TECHNICAL FIELD

The present technology pertains to systems, methods, and computer readable mediums for increasing multicast scale via localization of indices with hierarchical routing.

BACKGROUND

Many problems exist with current data packet routing and switching technology. For example, an index table is typically stored in a forwarding flow for all forwarding multicast routes. This index table is traditionally shared between various routes to optimize a number of indices used in the index table. An outgoing interface index is programmed with local members (sometimes the set being nil) symmetrically across all forwarding engines. As a result, the scale of the multicast entries depends on the number of indices available in a forwarding engine. In other words, a forwarding engine is programmed identically across all cards, thus a scale of a device is limited to a table size of the single forwarding engine.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A and 2B are block diagram of a system in accordance with an exemplary embodiment;

DESCRIPTION

Figure 1:
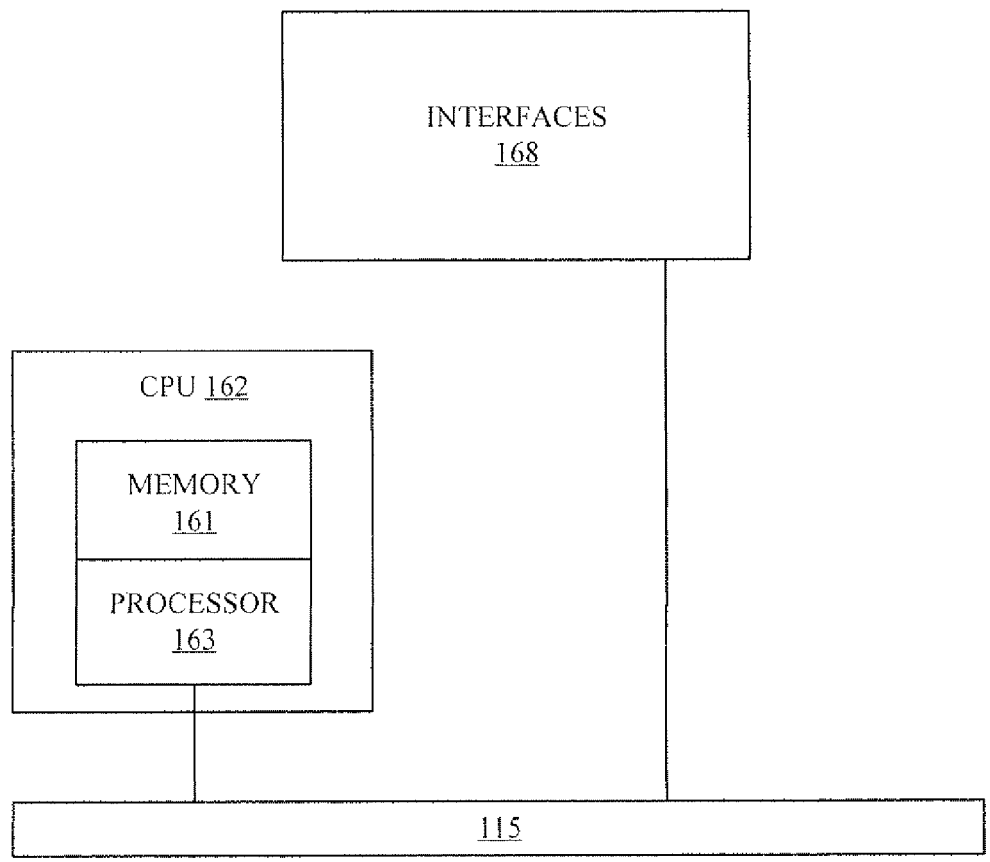
FIG. 1 is a block diagram of a network device in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview: disclosed are systems, methods, and non-transitory computer-readable storage media for improved routing and switching of data packets. For example, in one approach, hierarchical routing can allow for lookups to be performed in the backplane or fabric modules of a network device, and allocation of multicast outgoing interface lists can be localized on the individual line cards in the network device. In such embodiments, a plurality of line cards can have respective network forwarding engines and respective outgoing interface (OIF) lists, and at least one fabric module can be communicatively coupled with each line card with each fabric module having a respective network forwarding engine. The local OIF list for each line card can be asymmetrically programmed. The network forwarding engine of a line card can be configured to receive a multicast packet, compare a multicast address associated with the received multicast packet with entries in the local OIF list of the line card and forward the received multicast packet to at least one interface associated with the multicast address in response to the comparison resulting in a match. If the line card receives the multicast packet and determines it is the ingress line card for that multicast packet with respect to the network device, it can dynamically add an entry in its local OIF list based on that received packet. Moreover, each line card can dynamically build its own OIF list asymmetrically in this manner as it receives multicast packets. This can lead to support of a larger number of unique multicast outgoing interfaces for a node as a whole, even when a per-unit forwarding engine count is low.

When a line card receives a multicast packet and creates a local entry in its table or OIF list, it can also replicate the entry to the fabric module(s) to notify the fabric module(s) that such entry is associated with that particular line card. The fabric module(s) in the backplane can thus ensure that lookups are also performed in the backplane and multicast packets are forwarded to the correct line card(s) associated with the specific multicast packet. For example, if a multicast packet needs to go out on line cards 1 and 4, the fabric module(s) can forward the multicast packet to line cards 1 and 4 to be forwarded to the interfaces associated with that multicast packet, as listed in table or list in line cards 1 and 4. To this end, the fabric module(s) can maintain a list of associations between line cards, or respective ports, and specific multicast routes and/or entries. In some cases, the fabric module(s) can also flood the line cards with the multicast packet and allow each line card to make a determination as to whether that line card is the egress line card for that multicast packet. For example, if the number of entries for all line cards in the network device exceed the total amount of storage capacity of the fabric module(s) or forwarding engine in the fabric module(s) (e.g., if the number of line cards, and consequently the number of entries for all line cards, exceeds a threshold capacity of the fabric module(s)), the fabric module(s) can maintain a number of entries associated with the line cards that is lower than its threshold storage capacity, and maintain a default, flood entry for all other entries or routes.

This way, the multicast forwarding table size of the overall node can scale significantly, unlike in traditional forwarding architectures, where multicast forwarding table size is typically limited by a capacity of number of unique multicast outgoing interfaces of a forwarding engine. In some practical deployment scenarios, this modular chassis can scale to better numbers over a traditional multicast approach. This can lead to higher numbers of multicast forwarding entries in the modular chassis. When multicast members are localized to the same line card, beneficial scaling can result from this chassis.

The disclosed technology addresses the need in the art for systems, methods, and computer readable mediums for improved routing and switching of data packets. One approach is where due to hierarchical routing in place, a multicast outgoing interface allocation can be localized. This can lead to support of a larger number of unique multicast outgoing interfaces for a node as a whole, even when a per-unit forwarding engine count is low. This is in comparison to a traditional forwarding architecture, where multicast forwarding table size is typically limited by a capacity of number of unique multicast outgoing interfaces of a forwarding engine.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Referring to FIG. 1, an exemplary network device 110 suitable for implementing in accordance with an exemplary embodiment is illustrated. As shown, the network device 110 includes a master central processing unit (CPU) 162, interfaces 168, and a bus 115 (e.g., a PCI bus). When acting under the control of appropriate software or firmware, the CPU 162 is responsible for all computation. It preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Referring to FIGS. 2A and 2B, block diagrams of systems in accordance with exemplary embodiments are illustrated. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
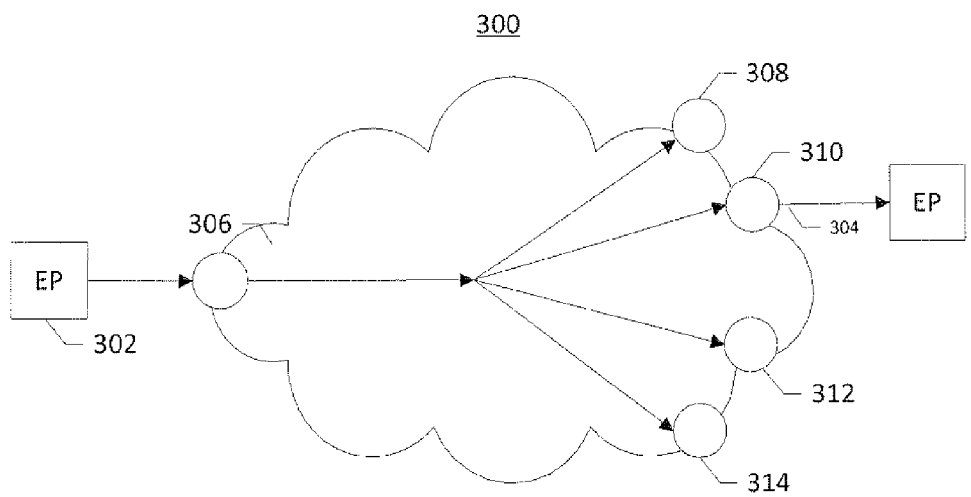
FIG. 3 is a block diagram of a communication system operating in a broadcast communication mode in accordance with an exemplary embodiment.

Referring to FIG. 3, a block diagram of a communication system operating in a broadcast communication mode in accordance with an exemplary embodiment is illustrated. As shown, a communication system 300 operating in broadcast mode can include a packet being transmitted by an originating node 306. The packet can have an unknown destination IP or MAC address. For example, originating endpoint 302 can transmit a packet to originating node 306, where the packet is intended for destination endpoint 304 but does not include an address associated with the node 310, which is the node attached to the destination endpoint 304 and is configured to receive and route packets destined to endpoint 304. Since originating node 306 is unaware of which of the nodes 308-314 is attached to the destination endpoint 304, it can broadcast the packet to all of the nodes 308-314. Nodes 308-314 then receive the packet and determine if they are the correct recipients. Those nodes that are not attached to the destination endpoint 304 specified in the packet can simply discard the packet, for example. When receiving the packet, destination node 310 can determine that destination endpoint 304 is attached to it and subsequently deliver the packet to destination endpoint 304 in well-known fashion.

Moreover, when operating in broadcast communication mode, originating node 306 can create a pending learning entry in the routing table, to indicate that a mapping or binding for such destination endpoint 304 may have to be learned from future communications. Here, originating node 306 can extract the address associated with the destination endpoint 304 from the packet, such as the IP or MAC address of the device, and create a pending learning entry in a routing table or an index table. In some cases, originating node 306 can also create an entry for destination endpoint 304 in a pending learning cache table, to indicate that a mapping or binding for destination endpoint 304 should be learned.

Figure 4:
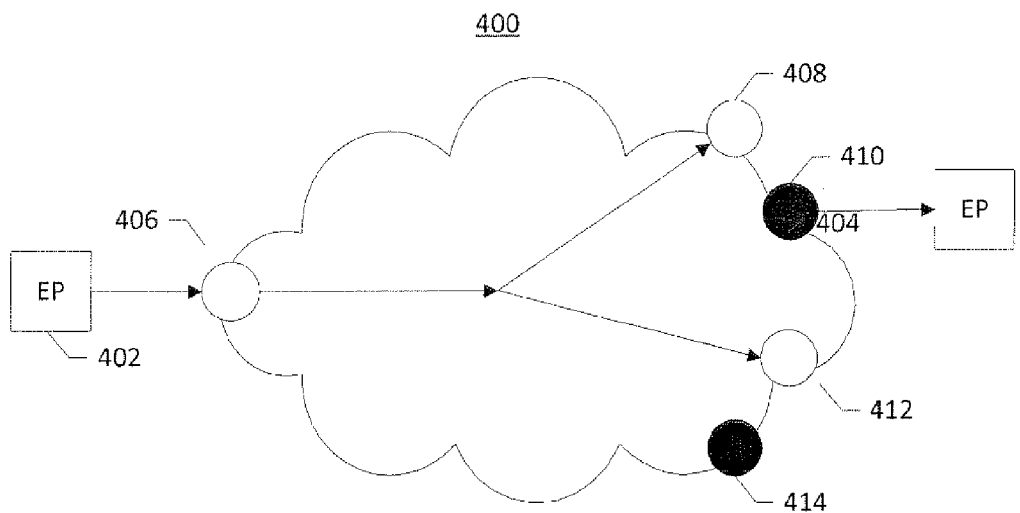
FIG. 4 is a block diagram of a communication system operating in a multicast communication mode in accordance with an exemplary embodiment.

Referring to FIG. 4, a block diagram of communication system operating in a multicast communication mode in accordance with an exemplary embodiment is illustrated. As shown, a communication system 400 operating in a multicast mode can include an originating node 406 transmitting a packet with an unknown destination IP or MAC address or a multicast route, operating in a multicast communication mode 400. Here, originating endpoint 402 can transmit a packet to originating node 406, where the packet is intended for destination endpoint 404 but does not include an address associated with the destination node 412 or otherwise includes a multicast route. Since originating node 406 may be unaware of which of the nodes 408-414 is attached to the destination endpoint 404, the originating node 406 can transmit the packet to all nodes subscribed to a multicast group, which in FIG. 4 include nodes 408 and 412 from the group of nodes 408-414.

Subsequently, nodes 408-414 can receive the packet and determine if they are the correct recipients. Those nodes that are not attached to the destination endpoint 404 specified in the packet can simply discard the packet, forward the packet, etc. On the other hand, destination node 412, which is attached to destination 404, can receive the packet and deliver it to destination endpoint 404 in well-known fashion.

When operating in multicast communication mode 400, originating node 406 can similarly create a pending learning entry in the index table, to indicate that a mapping or binding for destination endpoint 404 may have to be learned from future communications. Here, originating node 406 can extract the address associated with the destination endpoint 404 from the packet, and create a pending learning entry in an index table. In some cases, originating node 406 can also create an entry for destination endpoint 404 in a pending learning cache table, to indicate that a mapping or binding for destination endpoint 404 should be learned.

Referring to FIGS. 3 and 4, nodes 306-314 and/or nodes 406-414 can refer to devices, such as switches or routers, in a broadcast communication and a multicast communication, respectively. However, in other embodiments, nodes 306-

314 and/or 406-414 can refer to any software or hardware element or component in a multicast communication. For example, nodes 306-314 and/or 406-414 can refer to line cards and/or fabric modules in a network device configured to perform internal and external communications, including broadcast or multicast communications, respectively. Indeed, in some cases, node 306 and/or node 406 can be a fabric module and nodes 308-314 and/or 408-414 can be line cards in a network device. Here, node 306 and/or node 406 can be configured to flood line cards (i.e., nodes 308-314 and/or 408-414) with a packet, such as a packet using a broadcast compunction internal to the network device or as a multicast packet using a multicast communication internal to the network device. In yet other embodiments, the nodes 306-314 and/or 406-414 can be software elements, such as virtual switches or routers as well as virtual machines. Here, the software elements can be configured to communicate in a broadcast environment or multicast environment.

Moreover, the packet in the multicast communication can be a packet in any private, public, physical, or virtual network. For example, the packet can traverse a multicast in a layer 2 (L2) network, a virtual local area network (VLAN), and/or an overlay network, such as a virtual extensible local area network (VXLAN), an NVGRE, an STT, etc.

Figure 5:
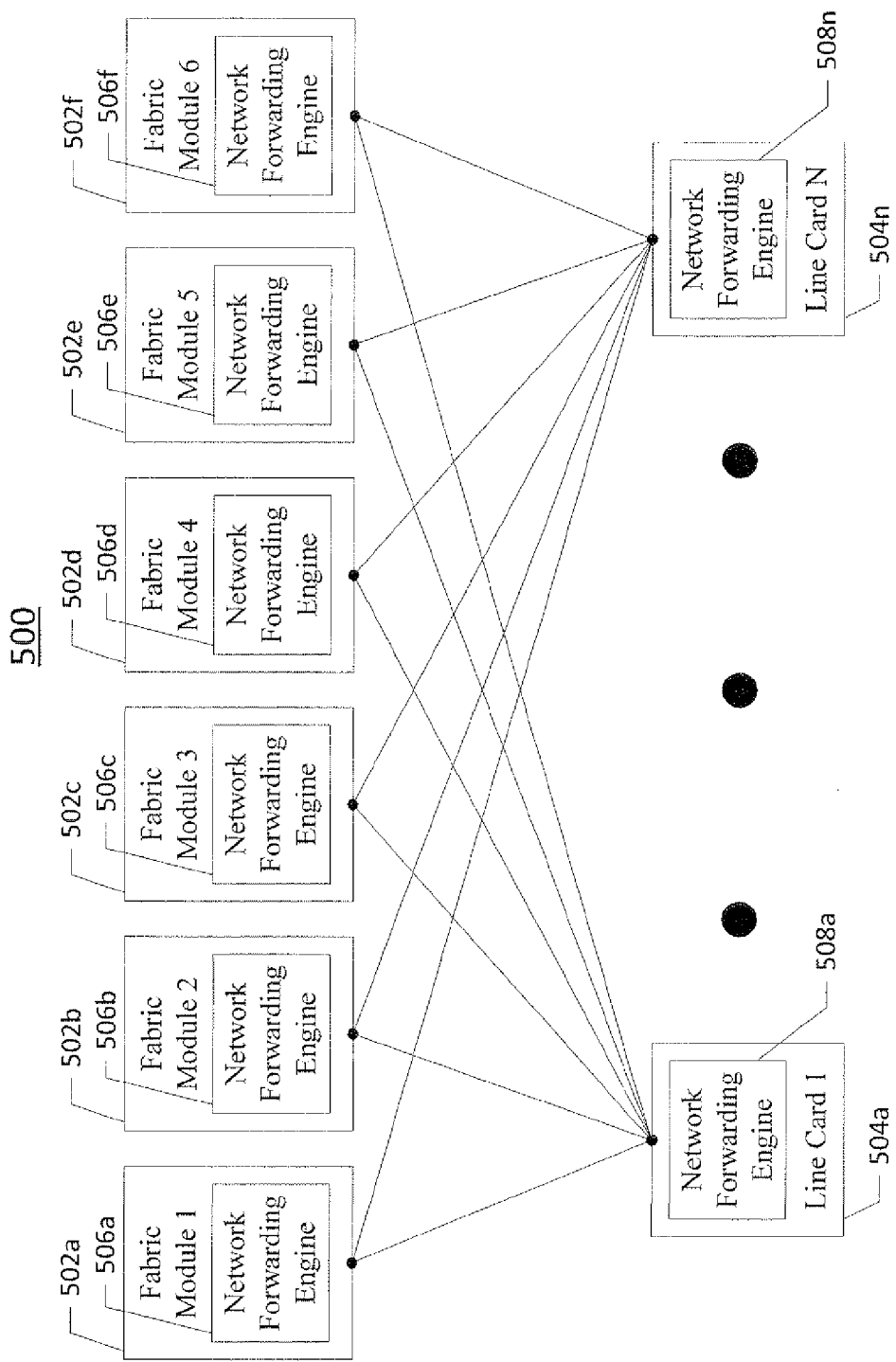
FIG. 5 is a block diagram of a distributed data plane for a network device in accordance with an exemplary embodiment.

Referring to FIG. 5, a block diagram of a distributed data plane for a network device, such as a switch (e.g., a ToR switch, a leaf switch, a VTEP, a virtual switch or router, a router, an edge device, etc.), in accordance with an exemplary embodiment is illustrated. As shown, each device 500 can include a plurality of fabric modules 502a-f with each fabric module communicatively coupled with a plurality of lines cards 504a-n. Each fabric module 502a-f can include an associated network forwarding engine 506a-f. Each line card 504a-n can similarly include an associated network forwarding engine 508a-n. In this example, the device 500 includes six (6) fabric modules 502a-f or fabric cards. In other embodiments, the device 500 can include more or less fabric modules 502.

In a traditional communication system operating in a multicast mode, the device 500 can include an index table listing all multicast routes in the forwarding flow. This index table can be traditionally shared between various routes to optimize on the number of indices used in this index table. This outgoing interface index table can be programmed with local members (sometimes the set being nil) symmetrically across all forwarding engines. As a result, the scale of the multicast entries depends on the number of indices available in a forwarding engine. For example, the index table for each line card 504 can be similar with the same null entries for the same ports across multiple line cards 504.

Given that this example includes a modular system with a lookup being done in the backplane, the number of indices available to the entire platform as a whole can be increased by asymmetric programming of these indices while still maintaining accurate functionality. For example, in a modular chassis device 500 with eight (8) front-panel facing line cards, it is possible to increase the scale from 32K (the size of a single forwarding engine) to eight (8) times that value as a theoretical maximum. In one example, the system can receive program routes on a line card, only if there are interested receivers or sources of a particular group associated with that line card. In this example, note that router ports can be given preferential treatment, in the sense; they are part of all outgoing interface lists (OIFs). A result of this change can imply that lookup on these multicast routes will lead to a miss in the hardware. Traditionally, this lookup would have passed, with the outgoing interface list being zero.

In one example hierarchical routing model, multicast frames that come in on a single forwarding-engine and need to get out on a different forwarding engine of the same or different line card can be sent towards the backplane fabric modules. In this example, the fabric modules can be programmed to direct this data back to the relevant line cards or flood the data to all line cards. For an 8-slot chassis in this example, the system may require only $2^{12}$ unique combinations. On receipt of this data, the local outgoing lookup will fail in most of the cards. On the line cards that pass this check, the outgoing interface index can give the list of ports to send the packets out.

In one example, the programming of the routes on a line card are not dependent on whether there are outgoing ports on that line card, and thus the system can be configured to reduce the requirement of the number of indices on a single forwarding engine. In this example, the worst case happens if there is a member on all line cards—in which case capacity reduces on the device as a whole as the same member will have an entry on every forwarding engine. Alternatively, in this example the best case takes place, when all routes are localized for every single line card, in which case the system is configured to scale to K line cards times the capacity of a forwarding engine in each line card. In practice, the scale can be a number between 1 and K, however, with K greater than 1, the configured system has improved the scale properties of this modular chassis.

Figure 6A:
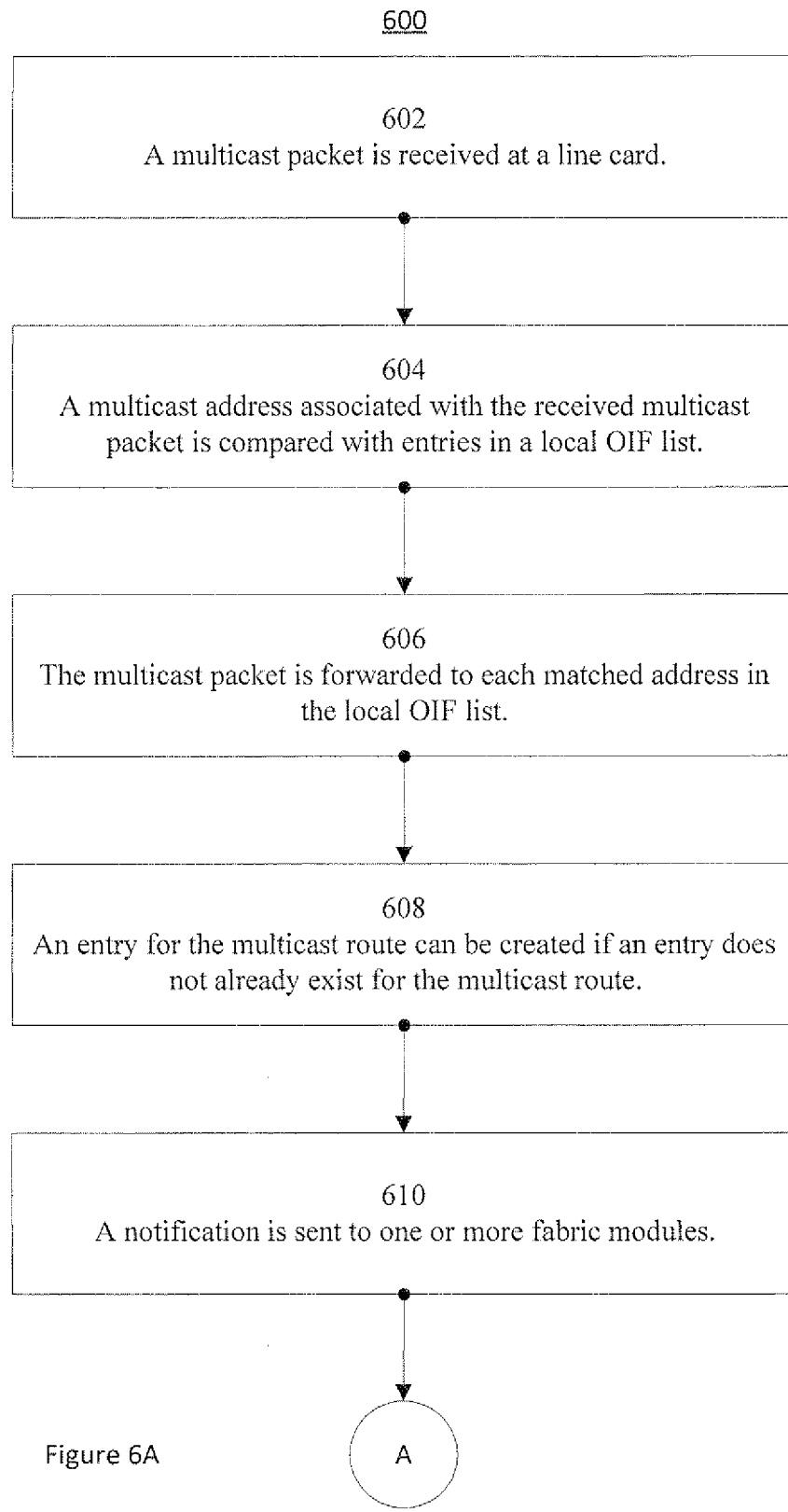
FIGS. 6A-6C is a flowchart of a method in accordance with an exemplary embodiment.
Figure 6B:
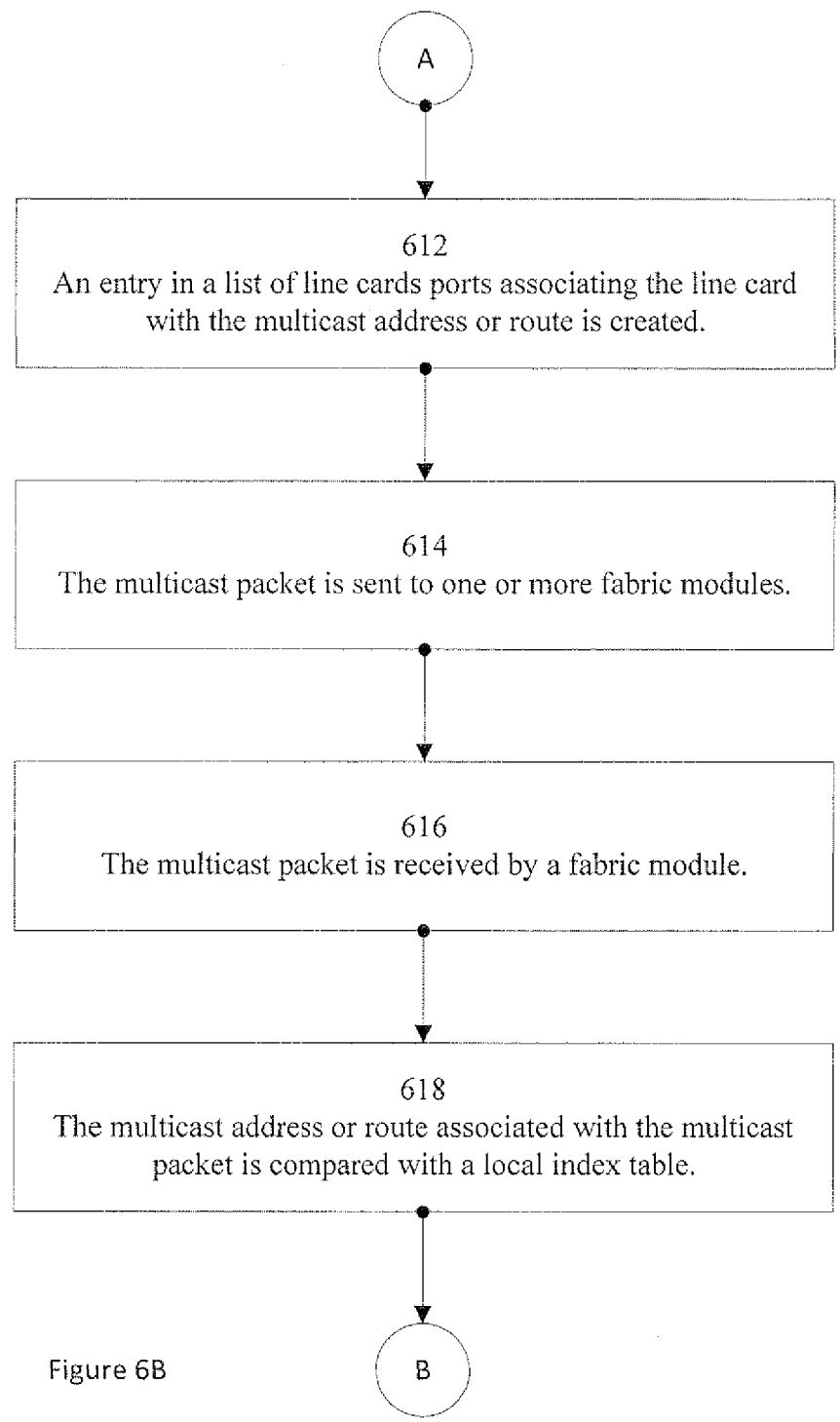
Figure 6C:
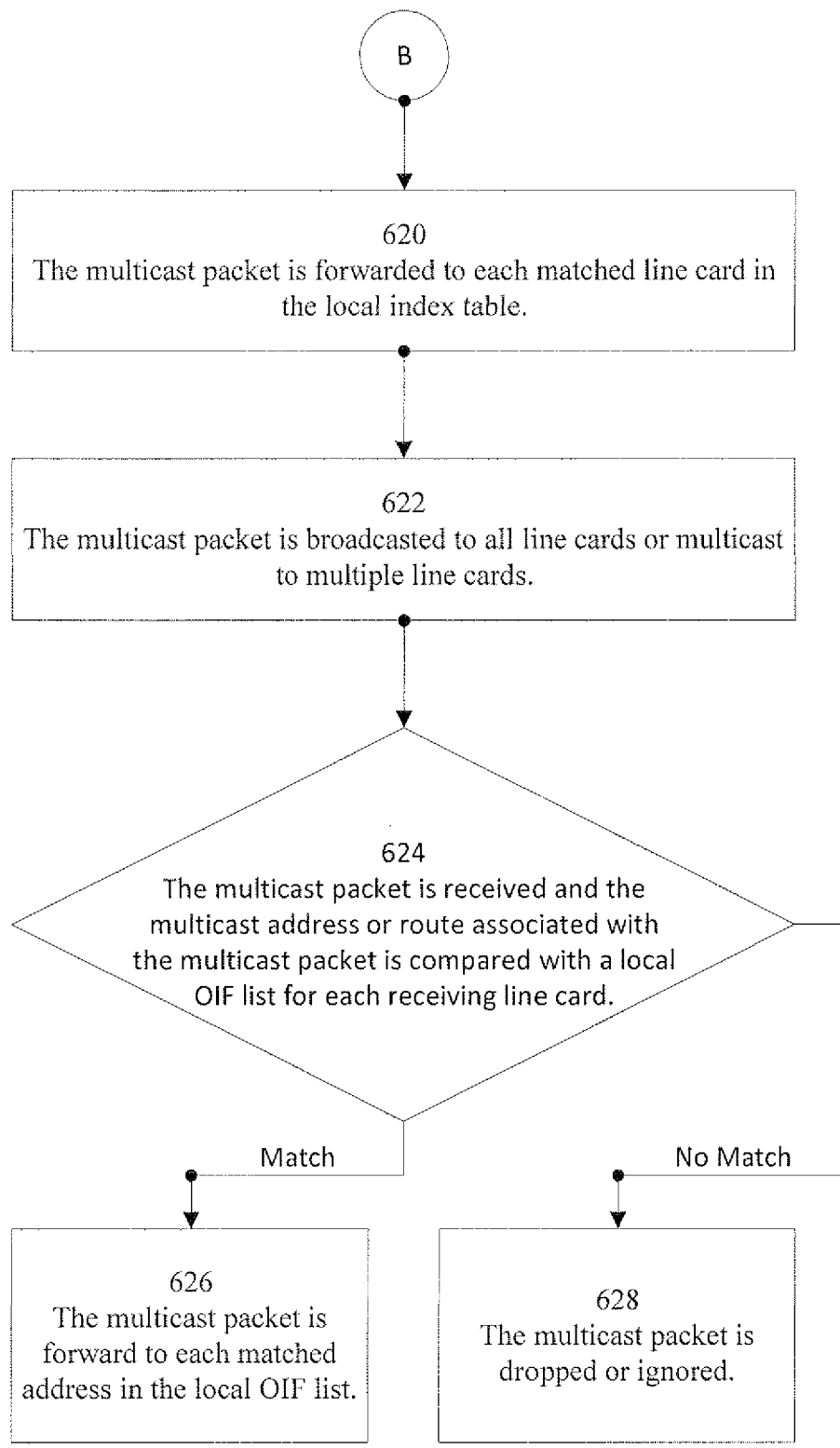

Referring to FIGS. 6A-6C, a flowchart for distributing a multicast packet in accordance with an exemplary embodiment is illustrated. The exemplary method 600 is provided by way of example, as there are a variety of ways to carry out the method. The method 600 described below can be carried out using the configurations illustrated in FIG. 5 by way of example, and various elements of this figure are referenced in explaining exemplary method 800. Each block shown in FIG. 6 represents one or more processes, methods or subroutines, carried out in the exemplary method 600. The exemplary method 600 can begin at block 602.

At block 602, a multicast packet is received at a line card. For example, a port of a line card 504 receives a multicast packet. The multicast packet can be sent by an interface, such as a network interface on a server, for example. The multicast packet can include a multicast route, which can represent one or more destination addresses. The received multicast packet can be an IP Multimedia Communications (IPMC) packet. The IPMC packet can represent one of Voice over IP (VOIP), video conferencing (VC), instant messaging (IM), whiteboarding, application sharing or other communication packet. Other types of packets, applications, or implementations are also contemplated herein. After receiving the multicast packet, the method 600 can proceed to block 604.

At block 604, a multicast address associated with the received multicast packet is compared with entries in a local outgoing interface (OIF) list. For example, the receiving line card 504 or a network forwarding engine 508 of the line card 504 can compare a multicast address associated with the received multicast packet with entries in a local OIF list associated with the line card 504. The local OIF list can be local to the line card 504 such that the local OIF list contains destination addresses and/or multicast routes for multicast groups or packets that are associated with that particular line card 504. If the line card 504 does not include an entry for the particular multicast route in the multicast packet, it can add an entry to the local OIF list and notify the backplane (i.e., fabric module(s) 502) of the newly added entry. Each line card 504 can dynamically build entries in its respective local OIF list as it receives multicast packets. As such, the local OIF list of the line card 504, and every other line card 504 in the system, is asymmetrically programmed with local entries. If the multicast address matches one or more entries in the local OIF list, the method 600 can proceed to block 606. If the multicast address does not match an entry in the local OIF list, the method 600 can proceed to block 608.

At block 606, the multicast packet is forwarded to each matched address in the local OIF list. For example, the line card 504 or the network forwarding engine 508 of the line card 504 forwards the multicast packet to each matched address or interface via one or more ports of the line card 504. In a non-limiting example, a line card 504 can receive a multicast packet on port 1 of the line card 504 and can forward the multicast packet on ports 2 and 3 of the line card 504 which correspond to destination addresses associated with the multicast packet where the destination addresses are associated with one or more entries in the local OIF list. After forwarding the multicast packet to each matched address in the local OIF list, the method 600 can proceed to block 608.

At block 608, an entry for the multicast route can be created if an entry does not already exist for the multicast route. For example, the line card 504 or the network forwarding engine 508 of the line card 504 can create an entry for the multicast route if an entry does not already exist. The entry can associate the originating or forwarding interface that sent the multicast packet and the multicast address or group associated with the received multicast packet. After creating an entry in the local OIF list, if not one did not already exist, the method 600 can proceed to block 610.

At block 610, a notification is sent to one or more fabric modules. For example, the network forwarding engine 508 of the line card 504 can send the notification to inform the one or more fabric modules 502 that the multicast address or group is associated with the line card 504 and/or that the multicast address or group was added to the local OIF list of the line card 504. In some embodiments, the notification can be sent to one or more the fabric module 502 associated or controlling the line card 504. In some embodiments, the notification can be sent to all of the fabric modules 502. After sending the notification, the method 600 can proceed to block 612.

At block 612, an entry in a list of line card ports associating the line card with the multicast address or route is created. For example, the fabric module 502 or a network forwarding engine 506 of the fabric module 502 can create an entry on its list of line card ports associating the line card with the multicast address, group, route, and/or packet. In another example, the fabric module 502 or a network forwarding engine 506 of the fabric module 502 can create an entry in an index table that associates the multicast address or group with the line card 504 that sent the notification. If the number of existing entries in the index table exceeds a predetermined threshold, the entry can be a flood entry, such as a default broadcast address. A flood entry can cause the multicast packet to be provided to all of the line cards 504. Each line card 504 can then determine if it is the appropriate line card 504 for handling (i.e., forwarding) the multicast packet and process the packet accordingly. After creating the entry, sending the notification, the method 600 can proceed to block 614.

At block 614, the multicast packet is sent to one or more fabric modules. For example, the line card 504 or the network forwarding engine 508 of the line card 504 can send the multicast packet to one, some or all of the fabric modules 502. This can allow the fabric modules 502 to forward the multicast packet back to a separate line card 504 that can also forward the multicast packet to local interfaces with respect to the separate line card 504. After sending the multicast packet, the method 600 can proceed to block 616.

At block 616, the multicast packet is received by a fabric module. For example, a fabric module 502 can receive the multicast packet from a line card 504 so the packet can be forwarded via other line cards 504 on the device. After receiving a multicast packet, the method 600 can proceed to block 618.

At block 618, the multicast address or route associated the multicast packet is compared with a local index table. For example, the fabric module 502 or a network forwarding engine 506 of the fabric module 502 can compare the multicast address or route associated with the received multicast packet with a local index table associated with the fabric module 502. The local index table can be local to the fabric module 502 such that the local index table contains multicast addresses or groups and their associated line cards 504. If the multicast address matches one or more entries in the local index table, the method 600 can proceed to block 620. If the multicast address does not match an entry in the local index table, the method 600 can proceed to block 622.

At block 620, the multicast packet is forwarded to each matched line card in the local index table. For example, the network forwarding engine 506 of the fabric module 502 forwards the multicast packet to each matched line card 504 via one or more ports of the fabric module 502. After forwarding the multicast packet to each matched line card, the method 600 can proceed to block 622.

At block 622, the multicast packet is broadcasted to all line cards or multicast to multiple line cards. For example, the fabric module 502 or the network forwarding engine 506 of the fabric module 502 broadcasts the multicast packet to all the line cards 504, unicast the packet to a single line card, or multicast the packet to multiple line cards except the line card 504 that forwarded the multicast packet to the fabric module 502. After broadcasting the multicast packet, the method 600 can proceed to block 624.

At block 624, the multicast packet is received and the multicast address or route associated with the multicast packet is compared with a local OIF list for each receiving line card. For example, one or more line cards 504 or network forwarding engine 508 of the line card 504 can receive and compare a multicast address or route associated with a local OIF list associated with the line card 504. If the multicast address matches one or more entries in the local OIF list, the method 600 can proceed to block 626. If the multicast address does not match an entry in the local OIF list, the method 600 can proceed to block 628.

At block 626, the multicast packet is forwarded to each matched address in the local OIF list. For example, the network forwarding engine 508 of the line card 504 forwards the multicast packet to each matched address via one or more ports of the line card 504. In a non-limiting example, a line card 504 can receive a multicast packet on port 1 of the line card 504 and can forward the multicast packet on ports 2 and 3 of the line card 504 which correspond to destination addresses associated with the multicast packet where the destination addresses are associated with one or more entries in the local OIF list.

At block 628, the multicast packet is dropped or ignored. For example, if the address associated with the multicast packet does not match any entries in the local OIF list, the network forwarding engine 508 of the line card 504 can drop or ignore the multicast packet.

When receiving a multicast packet, a fabric module can perform a lookup of ports and line card mappings which define which multicast groups, entries, or addresses are associated with line cards or ports in the device. This way, the fabric module can identify the egress line cards or ports for a specific multicast route, and forward the multicast to the egress line cards or ports identified, to be subsequently forwarded to the appropriate interfaces associated with the multicast route. The fabric module can thus perform a lookup in the backplane to ensure that a multicast packet is forwarded to the appropriate line cards in the device. The line cards here can include a single egress line card, or multiple line cards, depending on the configuration and specific multicast route.

Moreover, as previously mentioned, the line cards can learn and program multicast entries and build their respective OIF lists dynamically as they receive multicast packets. For example, if a line card receives a multicast packet, it can determine that the OIFs associated with the multicast route in the multicast packet are local to that line card and subsequently add an entry to its local list. The line card can also notify the fabric module(s) of this mapping to allow the fabric module to create an entry in its list associating that line card with the specific multicast route and/or OIFs. The system can perform local lookups at the line cards as well as a backplane lookup at the fabric modules as part of forwarding a multicast packet, to not only ensure that the packet is forwarded on all appropriate line cards, but also that the number of entries are scaled by programming the line cards asymmetrically to include local entries.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A system comprising:
a first and second fabric module, each fabric module having a respective network forwarding engine; and
a plurality of line cards coupled to the first and second fabric modules, with each line card having a respective network forwarding engine and a respective local outgoing interface (OIF) list, the respective network forwarding engine of each line card being configured to receive a multicast packet, and wherein each of the plurality of line cards is configured to perform operations comprising:
compare a multicast address associated with the received multicast packet with entries in the respective local OIF list; and
program the respective local OIF list with the multicast address associated with the received multicast packet if an entry for the multicast address does not exist in the local OIF list;
wherein the respective network forwarding engine of the line card is further configured to send a notification to the first and second fabric modules, the notification identifying an association of the multicast address of the received multicast packet with the line card; and
wherein when a number of entries in a list of indices for a fabric module exceeds a threshold, the fabric module enters a flood entry for the multicast address.

2. The system of claim 1 wherein each of the first and second fabric modules further have a list of indices, the respective fabric modules each being configured to add an entry in the list of indices with the entry associating the multicast address with the line card that received the multicast packet.

3. The system of claim 1 wherein the received multicast packet is an IP Multimedia Communications (IPMC) packet.

4. The system of claim 3 wherein the IPMC packet represents one of Voice over IP (VOIP), video conferencing (VC), instant messaging (IM), whiteboarding and application sharing.

5. A method comprising:
  receiving, at a line card, a multicast packet, where the line card is one of a plurality of line cards with each line card communicatively coupled to a first and second fabric module;
  comparing a multicast address associated with the received multicast packet with entries in a local outgoing interface (OIF) list;
  programming the local OIF list with the multicast address associated with the received multicast packet if an entry for the multicast address does not exist in the local OIF list;
  sending, by the network forwarding engine of the line card, a notification to each of the fabric modules, the notification identifying an association of the multicast address of the received multicast packet with the line card; and
  wherein if a number of entries in a list of indices for a fabric module exceeds a threshold, entering, by the network forwarding engine of the fabric module, a flood entry for the multicast address.

6. The method of claim 5 further comprising adding, by a network forwarding engine of the first and second fabric modules, an entry in a list of indices with the entry associating the multicast address with the line card that received the multicast packet.

7. The method of claim 5 wherein the received multicast packet is an IP Multimedia Communications (IPMC) packet.

8. The method of claim 7 wherein the IPMC packet represents one of Voice over IP (VOIP), video conferencing (VC), instant messaging (IM), whiteboarding and application sharing.

9. A non-transitory computer-readable storage medium having stored therein instructions which, when executed by a processor, cause the processor to perform operations comprising:
  receiving, at a line card, a multicast packet, wherein the line card is one of a plurality of line cards with each line card communicatively coupled to a first and second fabric module;
  comparing a multicast address associated with the received multicast packet with entries in a local outgoing interface (OIF) list;
  programming the local OIF list with the multicast address associated with the received multicast packet if an entry for the multicast address does not exist in the local OIF list;
  sending, by the network forwarding engine of the line card, a notification to each of the fabric modules, the notification identifying an association of the multicast address of the received multicast packet with the line card; and
  if a number of entries in a list of indices for a fabric module exceeds a threshold, entering, by the network forwarding engine of the fabric module, a flood entry for the multicast address.

10. The non-transitory computer-readable storage medium of claim 9 further comprising adding, by a network forwarding engine of the first and second fabric modules, an entry in a list of indices with the entry associating the multicast address with the line card that received the multicast packet.

11. The non-transitory computer-readable storage medium of claim 9 wherein the received multicast packet is an IP Multimedia Communications (IPMC) packet.

\* \* \* \* \*